United States Patent [19]
Karssemeijer

[11] Patent Number: 6,035,056
[45] Date of Patent: Mar. 7, 2000

[54] METHOD AND APPARATUS FOR AUTOMATIC MUSCLE SEGMENTATION IN DIGITAL MAMMOGRAMS

[75] Inventor: Nico Karssemeijer, Beek, Netherlands

[73] Assignee: R2 Technology, Inc., Los Altos, Calif.

[21] Appl. No.: 08/825,291

[22] Filed: Mar. 27, 1997

[51] Int. Cl.[7] .............................. G06K 9/00; A61B 6/04
[52] U.S. Cl. ........................... 382/132; 378/37; 382/281
[58] Field of Search ........................... 128/922; 382/128, 382/132, 171, 199, 281, 130, 131, 308; 378/37

[56] References Cited

U.S. PATENT DOCUMENTS

| | | | |
|---|---|---|---|
| 5,631,982 | 5/1997 | Inselberg et al. | 382/168 |
| 5,657,362 | 8/1997 | Giger et al. | 378/37 |

OTHER PUBLICATIONS

John C. Russ, The Image Processing Handbook, Second Edition, pp. 495–498, Jan. 1995.

Zhang et al., On the Discretization of Parameter Domain in Hough Transformation, Proceedings of the 13th International Conference on Pattern Recognition, pp. 583–585, Aug. 1996.

Suckling et al., Segmentation of Mammograms Using Multiple Linked Self–Organizing Neural Networks, Medical Physics, pp. 142–152, Feb. 1995.

Pereira et al., Detection and Characterization of Microcalcifications in Mammographic Images, 38th Midwest Symposium on Circuits and Systems, pp. 1369–1372, Aug. 1985.

Gonzalez et al., Digital Image Processing, pp. 173–175, Feb. 1992.

Levine, Vision in Man and Machine, pp. 519–525, Jan. 1985.

Suckling et al., 1995, "Segmentation of Mammograms Using Multiple Linked Self–Organizing Neural Networks," Medical Physics 22:145–152.

*Primary Examiner*—Jon Chang
*Assistant Examiner*—Jayanti K. Patel
*Attorney, Agent, or Firm*—Pennie & Edmonds LLP

[57] ABSTRACT

A method and apparatus for the automatic segmentation of the pectoral muscle boundary in a digital mammogram is disclosed. Parameters of the pectoral boundary line are determined by calculating gradient magnitudes of the digital mammogram in a region of interest, accumulating the gradient magnitudes into a parameter plane according to a Hough transform, and using information in the parameter plane for identifying the pectoral boundary. Prior to being accumulated in the parameter plane, the gradient magnitudes are weighted by a monotonic, multi-bit weighting function designed to exhibit larger variations near more densely populated levels of gradient magnitudes, and designed to exhibit smaller variations near less densely populated levels of gradient magnitudes, for allowing greater robustness against variations in gradient magnitudes among different digital mammograms.

19 Claims, 9 Drawing Sheets

METHOD AND APPARATUS FOR AUTOMATIC MUSCLE SEGMENTATION IN DIGITAL MAMMOGRAMS

FIELD OF THE INVENTION

The present invention relates to the field of computer aided diagnosis of medical images. In particular, the present invention relates to a method and apparatus for automatic segmentation of muscle tissue from the remainder of the breast tissue in digital mammograms.

BACKGROUND OF THE INVENTION

Breast cancer in women is a serious health problem, the American Cancer Society currently estimating that over 180,000 U.S. women are diagnosed with breast cancer each year. Breast cancer is the second major cause of cancer death among women, the American Cancer Society also estimating that breast cancer causes the death of over 44,000 U.S. women each year. While at present there is no means for preventing breast cancer, early detection of the disease prolongs life expectancy and decreases the likelihood of the need for a total mastectomy. Mammography using x-rays is currently the most common method of detecting and analyzing breast lesions.

Recently, computer-aided diagnosis (CAD) systems have been developed for assisting the radiologist in the early detection of abnormal lesions or other suspicious masses in digital mammograms. An example of such a system is disclosed in "Method and Apparatus for Fast Detection of Spiculated Lesions in Digital Mammograms," U.S. patent application Ser. No. 08/676,660, filed Jul. 10, 1996 and assigned to the assignee of the present invention. The contents of the above disclosure are hereby incorporated by reference into the present disclosure. The developed CAD systems digitize x-ray mammograms to produce a digital mammogram, and perform numerical image processing algorithms on the digital mammogram. The output of such a CAD system is, for example, a highlighted display capable of directing the attention of a radiologist to suspicious portions of the x-ray mammogram.

FIGS. 1A and 1B show digital mammograms taken from the mediolateral oblique ("MLO") view using methods known in the art. FIG. 1A shows a digital mammogram 100 generally comprising three major components: a background 102, a breast tissue portion 104, and a pectoral muscle portion 106. As shown in FIG. 1A, the pectoral muscle portion 106 lies to the upper left of the breast tissue portion 104, and a generally linear boundary is formed between the two portions. In a digital mammogram of the opposite breast, the pectoral muscle portion would lie to the upper right of the breast tissue portion in a roughly symmetric fashion. Importantly, both the MLO view and another common view, the lateral view, yield mammograms having breast tissue portions near the center of the frame and pectoral muscle portions generally near the corner of the frame.

It is a desirable first step in the numerical processing of the digital mammogram 100 to segment the pectoral muscle portion 106 from the breast tissue portion 104. By segmenting it is meant that parameters are derived to describe the effective boundary between the two portions for use in subsequent image processing algorithms. FIG. 1C shows such a pectoral boundary 108 for the digital mammogram of FIG. 1A, while FIG. 1D shows such a pectoral boundary 108 for the digital mammogram of FIG. 1B. For most practical purposes, the pectoral boundary 108 can be described as a straight line having a slope parameter $A_P$ and and an intercept parameter $B_P$, as shown in the coordinate system of FIG. 1E. Alternatively, the pectoral boundary 108 can be described by an offset $\rho_P$ and an angle $\theta_P$, as shown in FIG. 1E.

Segmentation or identification of the pectoral boundary 108 assists subsequent CAD processing by enabling the use of further image processing techniques inside the breast tissue and pectoral muscle portions. As a first example, knowledge of the pectoral boundary 108 assists in improving contrast within the breast tissue area by permitting "blocking out" of the pectoral region. As a second example, because the mammogram is a projection image, there may be some breast or glandular tissue overlapping the muscle near the pectoral boundary 108. Knowledge of the location of the pectoral boundary 108 can form the basis for special localized algorithms for detecting certain cancers, e.g. in lymph nodes, which would not be detected using the standard breast tissue algorithms. Finally, segmentation of the pectoral muscle by identification of the pectoral boundary 108 is an important preprocessing step for automated comparisons of images of the left and right breast, for detection of cancers revealed by asymmetry. In particular, knowledge of the pectoral boundary assists in precise registration of the left and right breast images.

One known method of automated mammogram segmentation is described in Suckling et. al., "Segmentation of Mammograms Using Multiple Linked Self-Organizing Neural Networks," Med. Phys. 22 (2), February 1995, pp. 145–152. This method, based on self-organizing topological map networks, is limited in that the neural network is separately trained on each mammogram based on a prior estimate of an initial training region in that mammogram. Unfortunately, the location of the training region is difficult when the location of the pectoral muscle is itself uncertain. Additionally, the training process is relatively slow, reducing throughput of the overall CAD system.

Accordingly, it is an object of the present invention to provide a fast method for automatic segmentation of the pectoral muscle portion from the breast tissue portion of a digital mammogram.

It is a further object of the present invention to provide a accurate identification of the pectoral boundary with minimal prior knowledge of the specific location or extent of the pectoral muscle in that digital mammogram.

It is still a further object of the present invention to provide a method for automatic segmentation of the pectoral muscle which is more robust against variations in the dynamic range and average gray scale levels of the pectoral and breast tissue portions of digital mammograms.

SUMMARY OF THE INVENTION

These and other objects of the present invention are provided for by a method of identifying a pectoral boundary in a digital mammogram by calculating gradient magnitudes of the digital mammogram in a region of interest, accumulating the gradient magnitudes into a parameter plane according to a Hough transform, and using information in the parameter plane for identifying the pectoral boundary. Prior to being accumulated in the parameter plane, the gradient magnitudes are weighted by a monotonic, multi-bit weighting function designed to exhibit larger variations near more densely populated levels of gradient magnitudes, and designed to exhibit smaller variations near less densely populated levels of gradient magnitudes, for allowing greater robustness against variations in gradient magnitudes among different digital mammograms.

In a preferred embodiment, the pectoral muscle is assumed to encompass a first corner of the digital mammogram. Only those weighted gradient magnitudes associated with a predetermined range of gradient angles are accumulated into the parameter plane. The predetermined range of angles generally includes an angle corresponding to the first corner of the digital mammogram and a first range of angles therearound.

Referring to the parameter plane as $H(\rho,\theta)$, subsequent to the step of accumulating, a normalized parameter plane $HN(\rho,\theta)$ is computed by normalizing each element $H(\rho,\theta)$ by a normalizing factor in a preferred embodiment. The normalizing factor is inversely related to the number of gradient magnitude pixels capable of being accumulated at $(\rho,\theta)$. In a preferred embodiment, the normalizing factor is determined for each pixel $(\rho,\theta)$ by backprojecting a line corresponding to $(\rho,\theta)$ into the image plane, determining the length L of this line, and setting the normalizing factor equal to $1/\text{sqrt}(L)$ if L is greater than a minimum number of pixels. In this manner, both short boundaries and longer boundaries are given appropriate weight before peak selection in the parameter plane. The location $(\rho_P,\theta_P)$ of a highest ranking local peak in the normalized parameter plane $HN(\rho,\theta)$ then corresponds to the parameters of the pectoral boundary.

In a preferred embodiment, the highest ranking local peak is determined by determining whether a first set of peaks of $HN(\rho,\theta)$ above a lower predetermined threshold $T_L$ can be found. If such a first set of peaks cannot be found, a NULL value is selected, indicating the absence of a pectoral boundary in the digital mammogram. If such a first set can be found, it is determined whether a second set of peaks of $HN(\rho,\theta)$ above an upper predetermined threshold $T_H$ can be found. If such a second set can be found, a corresponding area A of a segmented pectoral muscle in image space is computed for each of the second set of peaks. That peak having the greatest corresponding area A is selected as the highest ranking local peak. If such a second set of peaks above $T_H$ cannot be found, the largest peak in the first set of peaks is selected as the highest ranking local peak.

DETAILED DESCRIPTION OF THE INVENTION

Figure 1A:
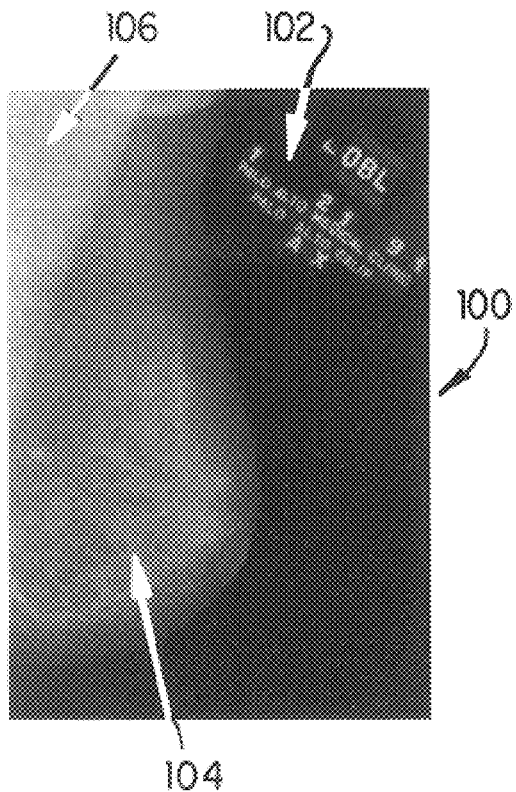
FIGS. 1A and 1B show mediolateral oblique digital mammograms before segmentation of the pectoral muscle.
Figure 1B:
Figure 1C:
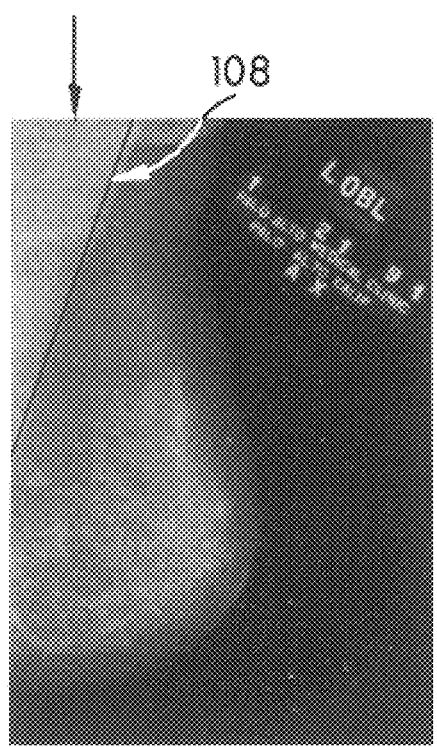
FIGS. 1C, 1D and 1E show the digital mammograms of FIGS. 1A and 1B after segmentation of the pectoral muscle.
Figure 1D:
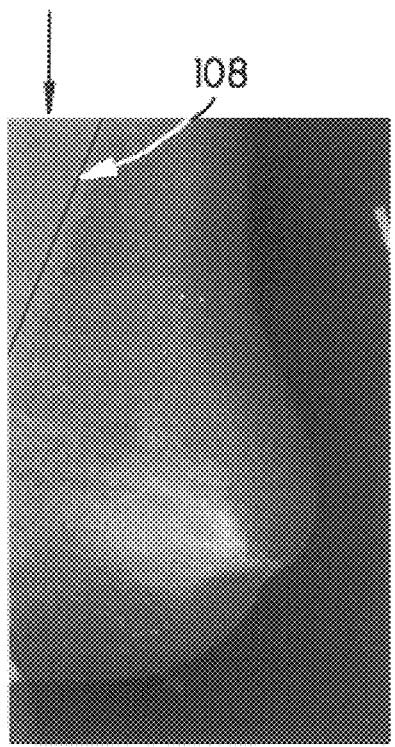
Figure 1E:
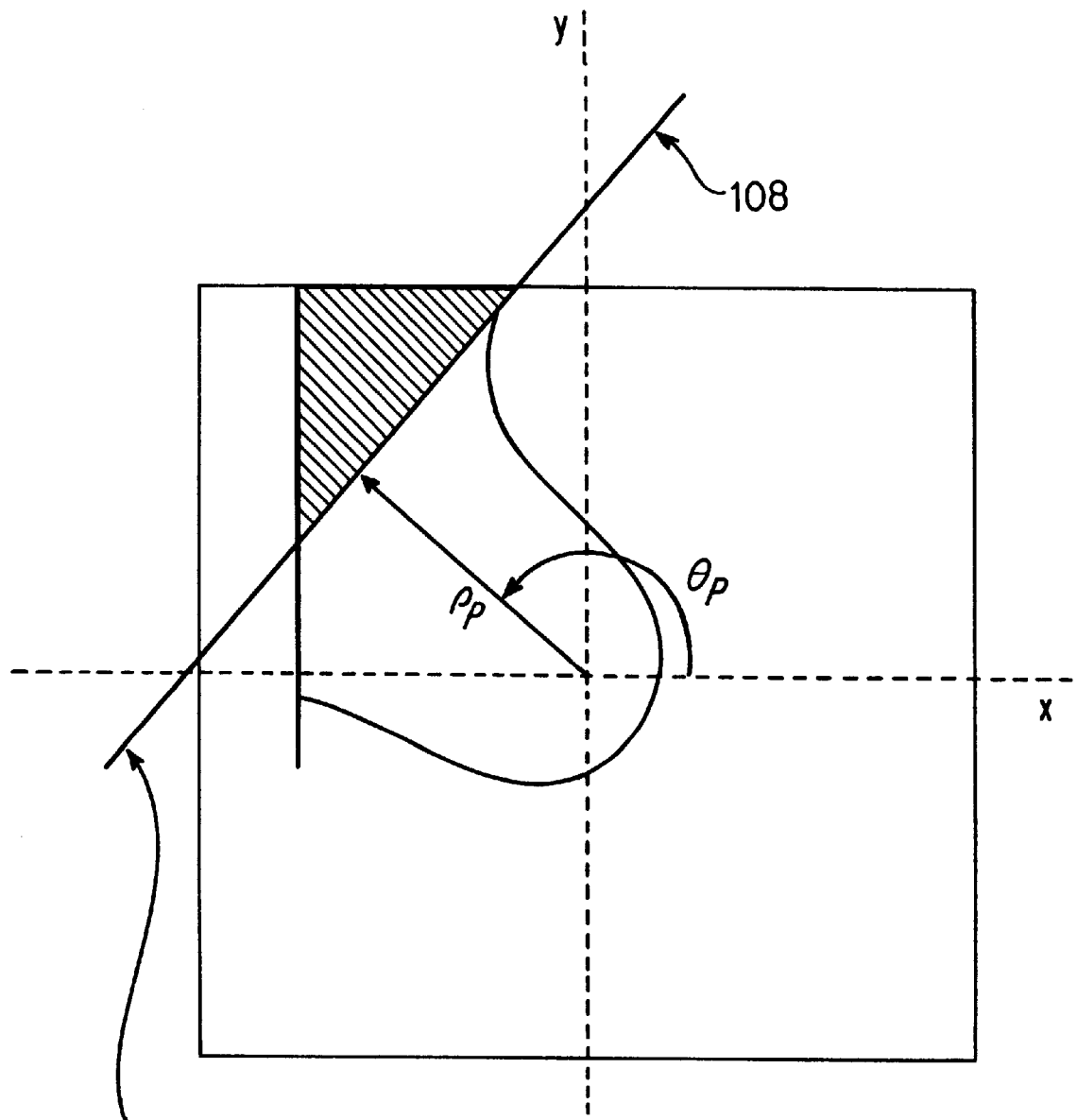
Figure 2A:
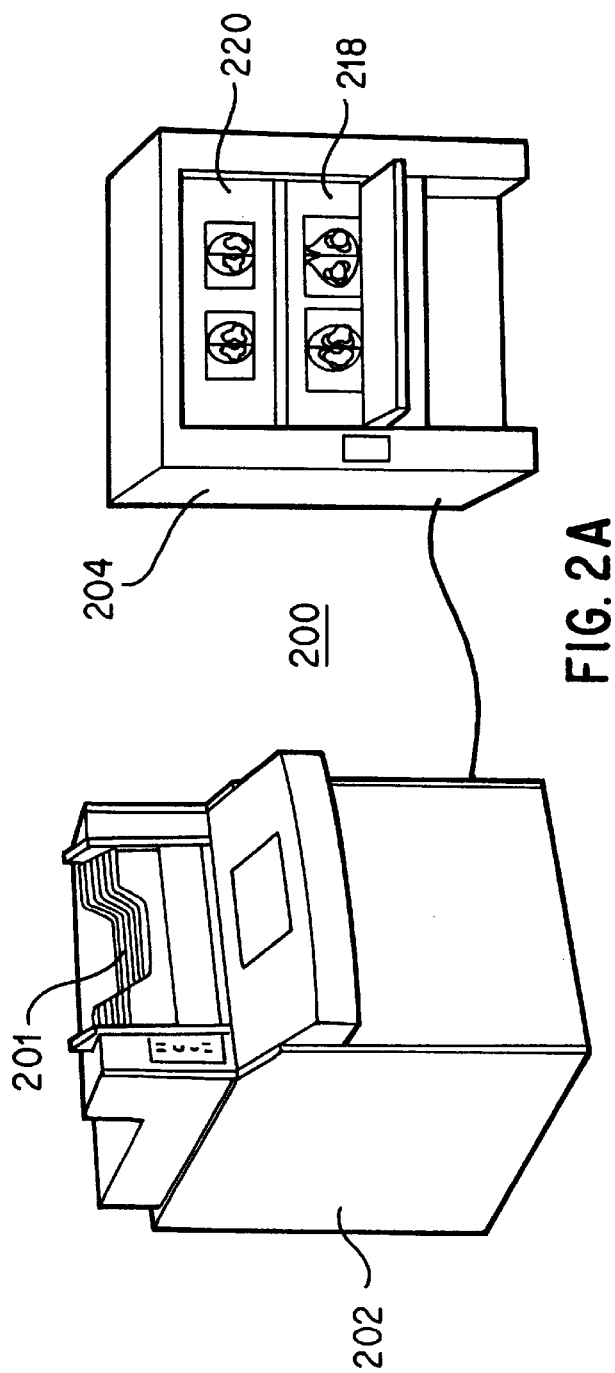
FIG. 2A shows an outside view of a computer aided diagnostic (CAD) system according to the present invention.

FIG. 2A shows an outside view of a computer aided diagnostic (CAD) system 200 for assisting in the identification of abnormal lesions or other suspicious masses in digital mammograms. CAD system 200 is used as a step in the processing of films for mammography exams. CAD system 200 comprises a CAD processing unit 202 and a viewing station 204. In general, CAD processing unit 202 scans an x-ray mammogram into a digital mammogram image, processes the image, and outputs a highlighted digital mammogram for viewing at viewing station 204.

Figure 2B:
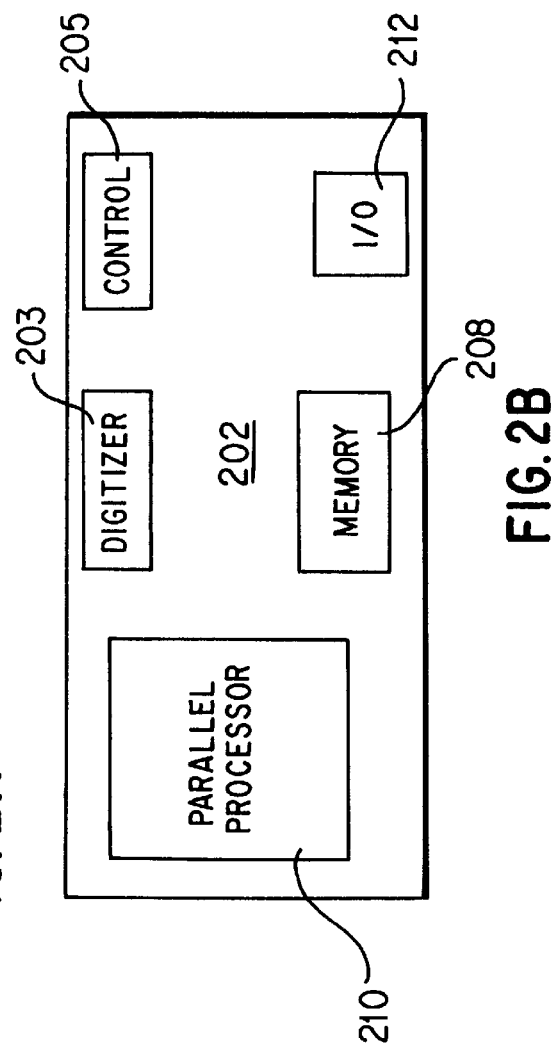
FIG. 2B shows a block diagram of a CAD processing unit of a CAD system according to the present invention.

FIG. 2B shows a block diagram of CAD processing unit 202. CAD processing unit 202 comprises a digitizer 203, such as a laser scanner with 50 micron resolution, for digitizing a developed x-ray mammogram 201, the x-ray mammogram 201 being shown in FIG. 2a at an input to the CAD processing unit 202. CAD processing unit 202 generally includes elements necessary for performing image processing including parallel processing steps. In particular, CAD processing unit 202 includes elements such as a central control unit 205, a memory 208, a parallel processing unit 210, and I/O unit 212. It is to be appreciated that in addition to the pectoral muscle segmentation algorithm disclosed herein, processing unit 202 is capable of performing a multiplicity of other image processing algorithms such as spiculation detection, mass detection, and linear classification algorithms. By way of example and not by way of limitation, the pectoral muscle segmentation algorithm disclosed herein is generally performed as a preprocessing step to the other image processing algorithms, which then advantageously use the parameters of the pectoral boundary 108 in detecting suspicious portions of breast tissue.

Viewing station 204 is for conveniently viewing both the x-ray mammogram 201 and the output of the CAD processing unit 202 on a display device 218. The display device 218 may be, for example, a CRT screen. The display device 218 typically shows a highlighted digital mammogram corresponding to the x-ray mammogram 201, the highlighted digital mammogram having information directing the attention of the radiologist to suspicious areas as determined by image processing steps performed by the CAD processing unit 202.

Viewing station 204 also comprises a backlighting station 220 for viewing the actual x-ray mammogram 201 itself. The radiologist is assisted by the CAD system 200 by viewing the display device 218, which then directs the attention of the radiologist to the suspicious portions of the actual x-ray mammogram 201 itself. It is to be appreciated that the CAD processing unit 202 is capable of performing several image processing algorithms on the digital mammogram in parallel in accordance with the present invention. In this manner, the radiologist may be informed of several suspicious areas of the mammogram at once by viewing the display device 218.

After x-ray mammogram 201 has been developed, it is inserted into the CAD system 200, which will ideally be located near the x-ray development area of a mammography clinic. After being digitized by digitizer 203, the x-ray mammogram will be transported using means not shown to the viewing station 204 for viewing by the radiologist along with the output of the display device 218 as described above. After the x-ray mammogram 201 has passed through the CAD system 200, it will be taken away and will undergo the same processing currently practiced in clinics. It is to be noted that memory 208 of CAD processing unit 202 may be used in conjunction with I/O unit 212 to generate a permanent record of the highlighted digital mammogram described above, and/or may also be used to allow non-real-time viewing of the highlighted digital mammogram.

Figure 3:
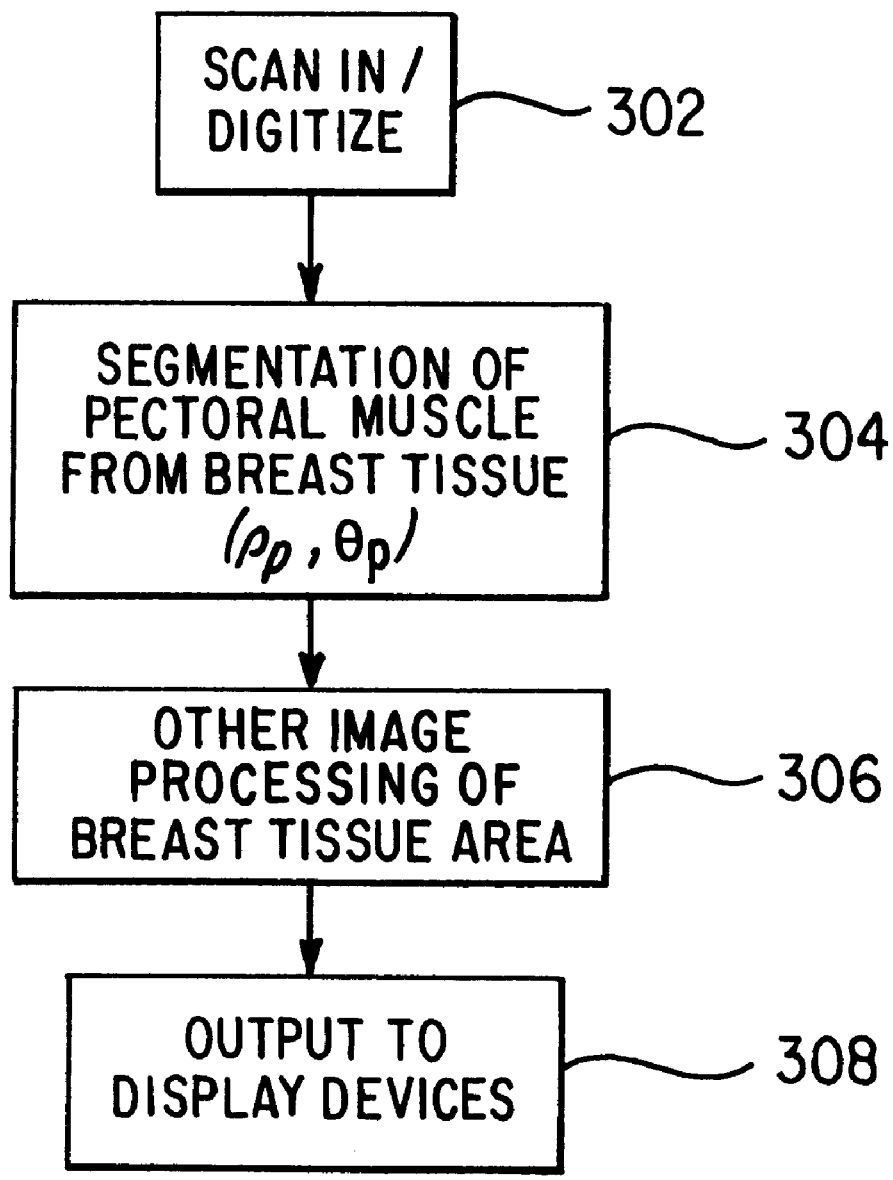
FIG. 3 is a flowchart representing overall steps taken by the computer aided diagnostic (CAD) system of FIGS. 1A and 1B.

FIG. 3 shows the general steps performed by CAD processing unit 202 on the x-ray mammogram. At step 302, the x-ray mammogram is scanned in and digitized into a digital mammogram. The digital mammogram may be, for example, a 3000×4000 array of 12-bit gray scale pixel values. Such a digital mammogram would generally correspond to a typical 8"×10" x-ray mammogram which has been digitized at a 50 micron spatial resolution. At step 304, the pectoral muscle portion of the digital mammogram is segmented from the breast tissue portion, generating the parameters ($\rho_P$, $\theta_P$) of the pectoral boundary. At step 306, other image processing algorithms are performed on the digital mammogram, such as spiculation detection, mass detection, and linear classification algorithms.

Importantly, some of the subsequent image processing algorithms performed at step 306 will advantageously use the parameters $\rho_P$ and $\theta_P$, while others may not. Those that do not use these parameters may, of course, be performed either serially or in parallel with step 304. Also, in one embodiment of the invention, the step 306 may simply comprise steps for preparing left and right mammograms for side-by-side display to the radiologist, wherein the parameters ($\rho_P$, $\theta_P$) are advantageously used for image registration. Finally, at step 308, the processed mammograms are displayed to the radiologist using at viewing station 204.

Figure 4:
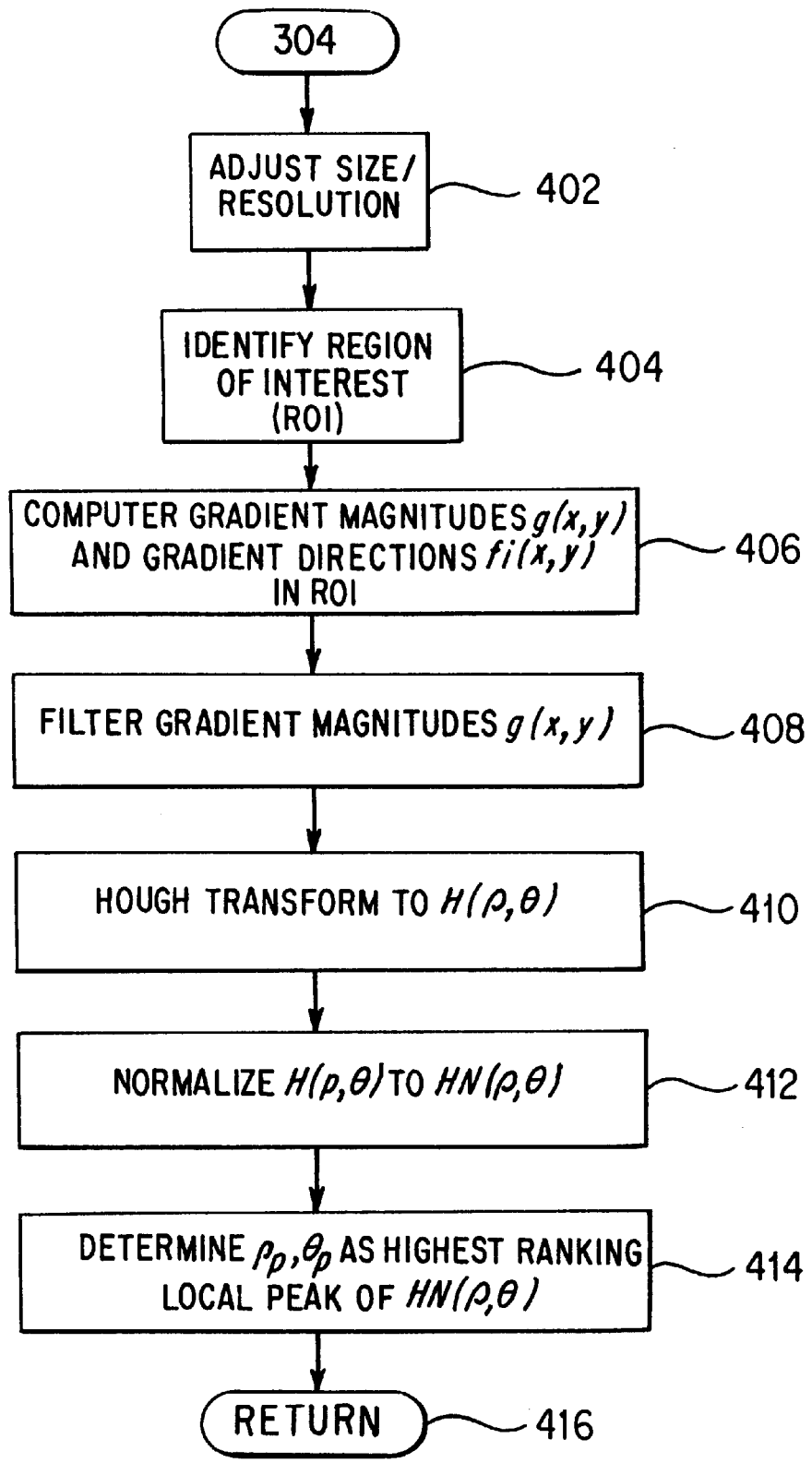
FIG. 4 is a flowchart representing steps for segmenting the pectoral muscle boundary according to a preferred embodiment.

FIG. 4 shows the overall steps performed at step 304 in segmenting the pectoral muscle portion from the breast tissue portion according to a preferred embodiment. FIG. 4 first shows a step 402 for adjusting the resolution of the digital mammogram 100. Because a full resolution image such as the 3000×4000 image described above is not necessary for the segmentation of the pectoral muscle, the image may be locally averaged, using steps known in the art, down to a smaller size corresponding, for example, to a 1.6 millimeter per pixel spatial resolution. The image may also be clipped to form a square frame. At 1.6 millimeter per pixel resolution, a typical image would then be an N×N array of 12-bit gray scale pixel values, with N being near 128, for example. Once the parameters $\rho_P$ and $\theta_P$ are known for this smaller image, they may be scaled appropriately, using steps known in the art, prior to subsequent processing by the other image processing algorithms.

It is to be appreciated that either the full resolution image or the locally averaged image may be used as the original digital mammogram in accordance with the present invention. It has been found, however, that the local averaging performed at step 402 yields a smaller-scale image which is processed much faster, without an undue sacrifice of precision in the values of $\rho_P$ and $\theta_P$. Additionally, it has been found that certain processing steps, such as the step 406 of computing gradients disclosed infra, actually produce better results when performed on the coarser, smaller-scale image. Without limiting the scope of the present invention, and for clarity of disclosure, the digital mammogram 100 is considered to be an exemplary N×N array of 12-bit gray scale pixel values, with N=128.

Following step 402, FIG. 4 generally shows a step 404 for determining a region of interest (ROI) of the digital mammogram 100, which is followed by a step 406 for computing gradient magnitudes g(x,y) and gradient directions fi(x,y) within the region of interest. FIG. 4 then shows a step 408 for filtering the gradient magnitudes g(x,y), this filtering being based on the simple assumption that the pectoral boundary lies in a first corner of the digital mammogram 100 and has a direction lying within a range of predetermined directions. At step 410, the gradient magnitudes g(x,y) are accumulated, according to a special adaptation of the Hough transform, to a parameter plane H($\rho$,$\theta$).

At step 412, the parameter plane H($\rho$,$\theta$) is normalized into a normalized parameter plane HN($\rho$,$\theta$), with the normalizing factor compensating for the fact that different lines in the gradient magnitude plane will have different lengths and thus will contribute unequally to parameter plane locations ($\rho$,$\theta$). Finally, at step 414, the local peaks of HN($\rho$,$\theta$) are considered, and the pectoral boundary parameters ($\rho_P$,$\theta_P$) are determined by the highest ranking local peak of HN($\rho$,$\theta$).

Figure 5:
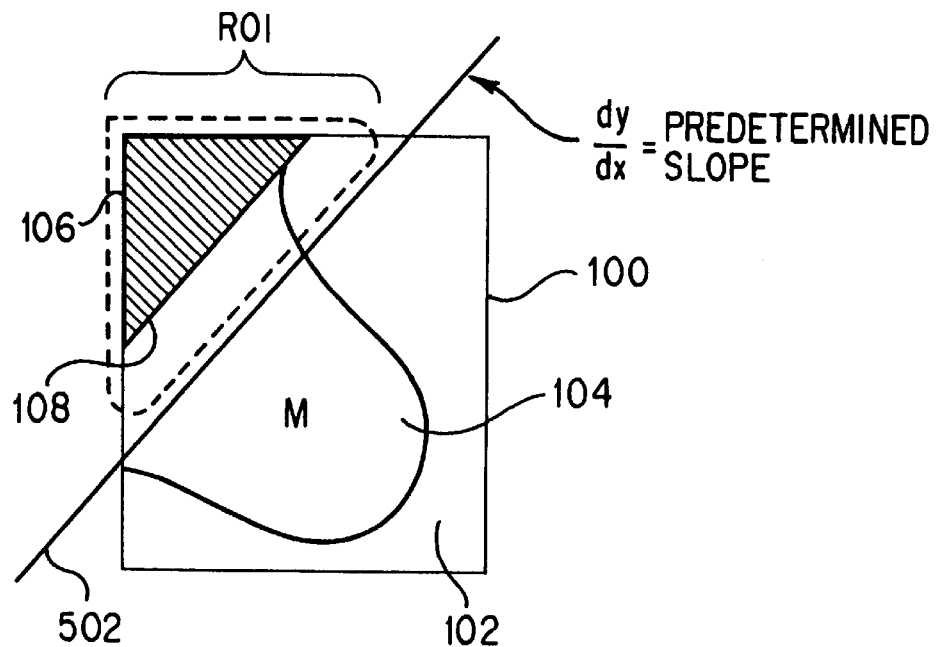
FIG. 5 shows a diagram of a region of interest in a digital mammogram according to a preferred embodiment.

The above steps will now each be described in detail. FIG. 5 shows a diagram of a digital mammogram 100 for describing the step 404 for identifying the region of interest ROI. Using methods known in the art such as a simple low thresholding method, the background portion 102 is first clipped to zero. Again using techniques known in the art, the center of mass M of all tissue areas is then determined. Using the simple and reliable assumption that the pectoral boundary 108 lies in the upper left hand corner of the digital mammogram 100, the region of interest ROI can be identified as lying to the upper left of a line 502 drawn through the center of mass M. It has been found that the line 502 may be of a constant, predetermined slope for virtually all mammograms. In a preferred embodiment, where the scaled digital mammogram is the size described previously, the slope of this line is approximately 1.5. In general, however, this slope may be empirically adjusted according to the specific parameters of the CAD system used.

Importantly, as with all of the steps described below, the variable x may be replaced by −x where the opposite breast is displayed and the pectoral boundary is known to lie in the upper right hand corner of the digital mammogram 100. Indeed, it is to be appreciated that the method of the present disclosure is easily adapted to other configurations as well, using a standard rotation of coordinates known to any person of skill in the art. In particular, the method of the present disclosure is readily adapted for any digital mammogram 100, provided that an initial presumption can be made regarding the quadrant (or other appropriate sector) and range of possible orientations of the pectoral boundary.

Following the step 404, gradient magnitudes g(x,y) and gradient directions fi(x,y) are computed inside the region of interest ROI at step 406. The gradient magnitudes g(x,y) and gradient directions fi(x,y) may be computed, for example, using a 3×3 Sobel operator according to methods known in the art. As known in the art, the gradient magnitudes g(x,y) are greatest at locations corresponding to edges in the digital mammogram, and the gradient directions fi(x,y) correspond to the directions of greatest change in the digital mammogram. It is to be appreciated that for large structures such as the pectoral boundary, the 3×3 Sobel operator produces a better gradient image when applied to a coarser, smaller-scale version of the digital mammogram such as the exemplary 128×128 version. If a full-scale resolution image is used, i.e., if step 402 is not performed or only reduces the scale by a minor amount, the 3×3 Sobel operator should be scaled accordingly to capture the larger pectoral boundary.

Figure 6:
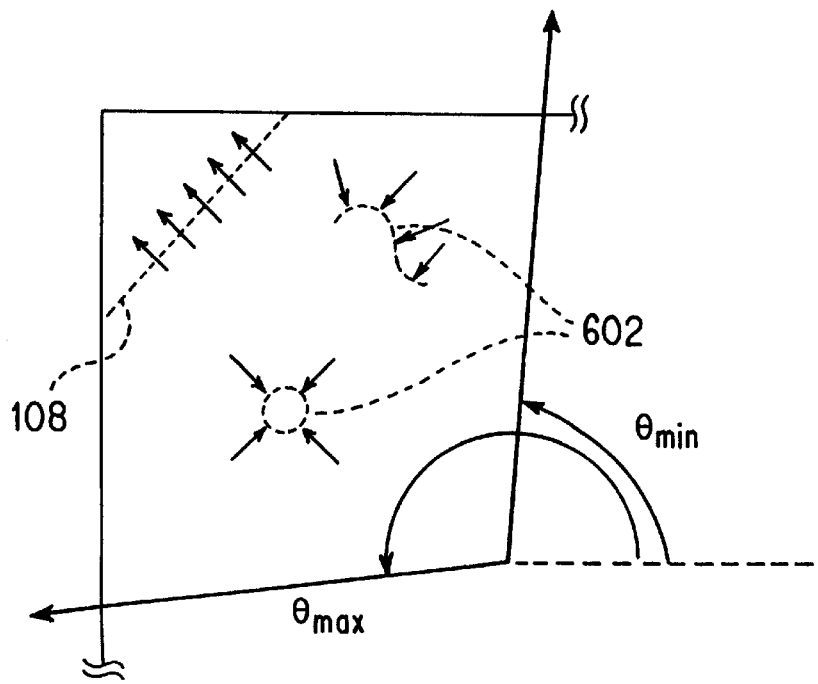
FIG. 6 shows a simplified diagram of the gradient vectors associated with portions of the digital mammogram inside the region of interest.

FIG. 6 shows a simplified diagram of the gradient vectors associated with portions of the digital mammogram 100 inside the region of interest ROI, in particular the pectoral boundary 108 and other fibrous breast tissue 602. As shown in FIG. 6, the gradient directions associated with pixels near the pectoral boundary 108 will generally point in a direction somewhere between a minimum angle $\theta_{min}$ and a maximum angle $\theta_{max}$ in the digital mammogram. Accordingly, at step 408, the gradient magnitude plane g(x,y) is filtered according to the gradient directions fi(x,y) for each pixel as dictated in equation (1).

$$g(x, y) = \begin{cases} 0 & \text{for } fi(x, y) < \theta_{min} \\ g(x, y) & \text{for } \theta_{min} <= fi(x, y) <= \theta_{max} \\ 0 & \text{for } fi(x, y) > \theta_{max} \end{cases} \quad \{\text{Eq. 1}\}$$

In this manner, only those pixels associated with gradient angles within a range likely to be normal to the pectoral boundary are considered further in the algorithm. In a preferred embodiment, where the scaled digital mammogram is the size described previously, the value of $\theta_{min}$ is approximately PI/2 and the value of $\theta_{max}$ is approximately PI. In general, however, this slope may be empirically adjusted according to the specific parameters and characteristics of the x-ray and CAD system used.

Figure 7:
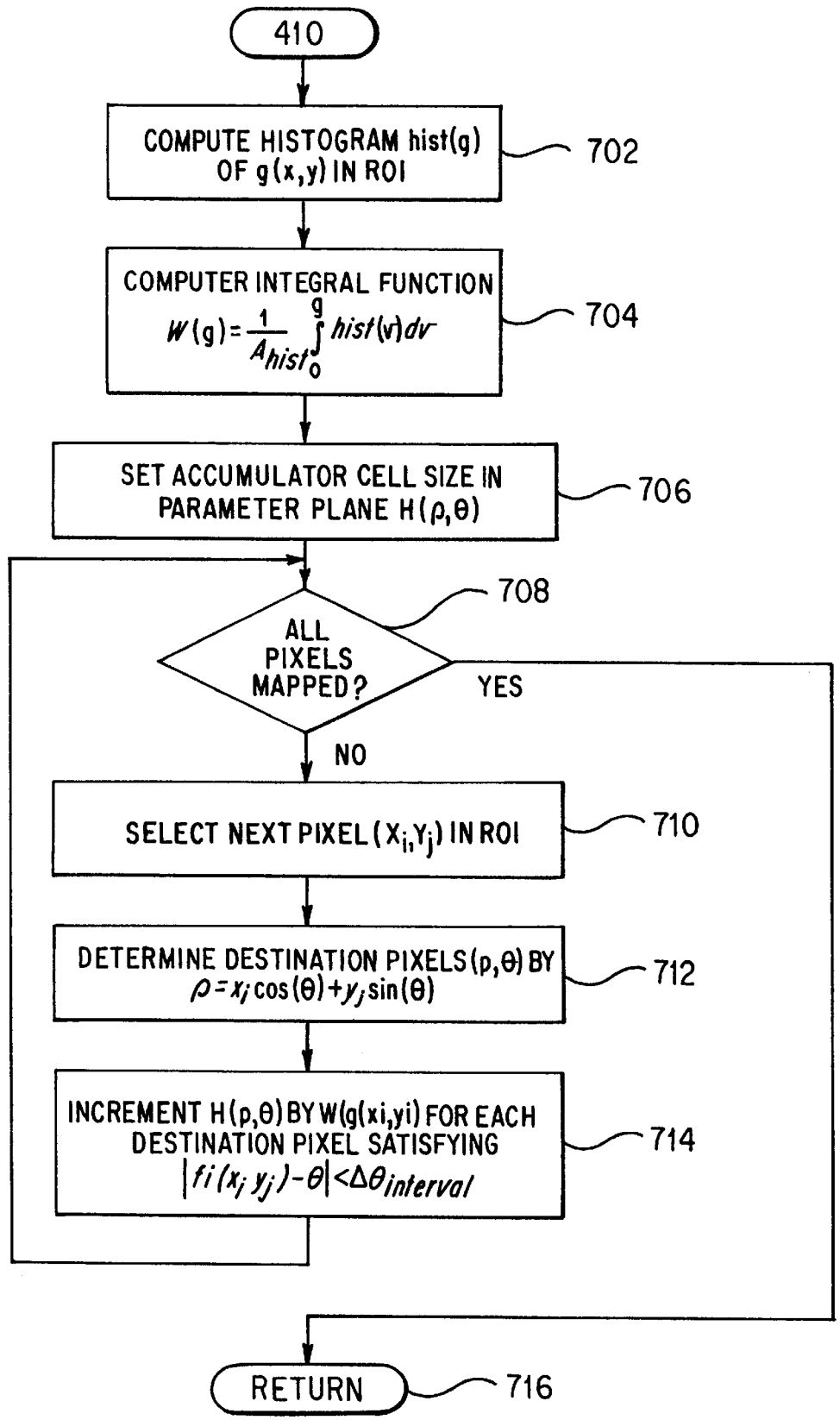
FIG. 7 shows steps for accumulating gradient magnitudes into a parameter plane according to a Hough transform.

FIG. 7 shows steps corresponding to the step 410 for accumulating the gradient magnitudes g(x,y) into a parameter plane $H(\rho,\theta)$ according to a specialized form of the Hough transform. The Hough transform generally involves an accumulation of points from a source plane into subspaces of a parameter plane according to a mapping function, and is described generally in Gonzalez and Wintz, *Digital Image Processing*, 2d Ed. (Addison-Wesley 1987) at pp. 130–134, the disclosure of which is hereby incorporated by reference into the present disclosure.

FIG. 7 shows a step 702 for computing the histogram hist(g) of all gradient magnitudes g(x,y) for all pixels (x,y) in the region of interest ROI. Subsequent to this step, at step 704 a weighting function W(g) is computed as the integral of the histogram hist(g) taken from zero to g, this integral being normalized by the factor $(1/A_{hist})$, where $A_{hist}$ is the total area under the function hist(g). The resulting function W(g) is a monotonic, multi-bit function and is used as a weighting function in incrementing the Hough parameter plane $H(\rho,\theta)$. In particular, for each point $(\rho,\theta)$ into which each pixel $(x_i,y_j)$ in the region of interest ROI is mapped, the value $H(\rho,\theta)$ is incremented by $W(g(x_i,y_j))$.

At step 706, the size of the Hough accumulator cells in the parameter plane $H(\rho,\theta)$ is determined. In a preferred embodiment, where the scaled digital mammogram is the size described previously, the size of the accumulator cells is N/sqrt(2) in the $\rho$ direction and PI/128 in the $\theta$ direction. In general, however, these cell sizes may be empirically adjusted according to the specific parameters of the CAD system used.

Beginning at step 708, the gradient magnitude pixels are weighted and accumulated into the Hough parameter plane $H(\rho,\theta)$. At step 708, it is determined whether all gradient magnitude plane pixels have been mapped. If so, the routine exits at step 716. Otherwise, at step 710, the next pixel $(x_i,y_j)$ in the region of interest ROI is selected. At step 712, the Hough parameter plane destination pixels are selected according to a common Hough transform mapping shown in equation (2).

$$\rho = x_i \cos(\theta) + y_j \sin(\theta) \quad \text{(Eq. 2)}$$

At step 714, the value of $H(\rho,\theta)$ for each destination pixel satisfying equation (2) is incremented by $W(g(x_i,y_j))$, where W(g) is the weighting function disclosed above, if the value of $\theta$ is within a fixed interval $\Delta\theta_{INTERVAL}$ of the gradient angle fi($x_i,y_j$) associated with the pixel ($x_i,y_j$). The value of $\Delta\theta_{INTERVAL}$ may be empirically determined, or may optionally be set to 2*PI in which all accumulator pixels satisfying equation (2) are incremented. Generally, $\Delta\theta_{INTERVAL}$ may be made smaller to increase the speed of the Hough transform step, because only certain ranges of $\theta$ will be of interest in the peak detection step. Following the step 714, the step 708 is again performed. When all region of interest ROI pixels ($x_i,y_j$) have been mapped, the Hough transform step 410 is complete.

Importantly, with respect to the Hough transform step 410, it has been found that the weighting function W(g) as defined exhibits larger variations near more densely populated levels of gradient magnitudes, and exhibits smaller variations near less densely populated levels of gradient magnitudes. Thus, even if the gradient magnitudes have a small dynamic range (i.e. it is hard to tell the background level from the signal level in the gradient magnitude plane), the Hough parameter plane $H(\rho,\theta)$ will reflect a detection and amplification of these small differences. Accordingly, the algorithm will be highly robust against changes in gray scale among digital mammograms due to variations in film processing, digitization, and the like. Despite variations in background and contrast levels in the digital mammograms, the algorithm will be highly sensitive to the presence of lines in the resulting gradient images, and will thus have an increased likelihood of accurate detection of the pectoral muscle boundary.

At step 412, the Hough parameter plane $H(\rho,\theta)$ is normalized into a normalized parameter plane $HN(\rho,\theta)$. First, all values of $H(\rho,\theta)$ are set to zero for $\rho<0$ or for $0.7^*PI<\theta<0.98$ PI. This again reflects the prior knowledge that the pectoral boundary, lying in the predetermined upper-left quadrant of the digital mammogram 100, will only have an angle outside these ranges according to the coordinate system of FIG. 2E. Again, the parameters 0.7*PI and 0.98*PI may be empirically adjusted according to the specific characteristics of the x-ray and CAD systems used.

Figure 8:
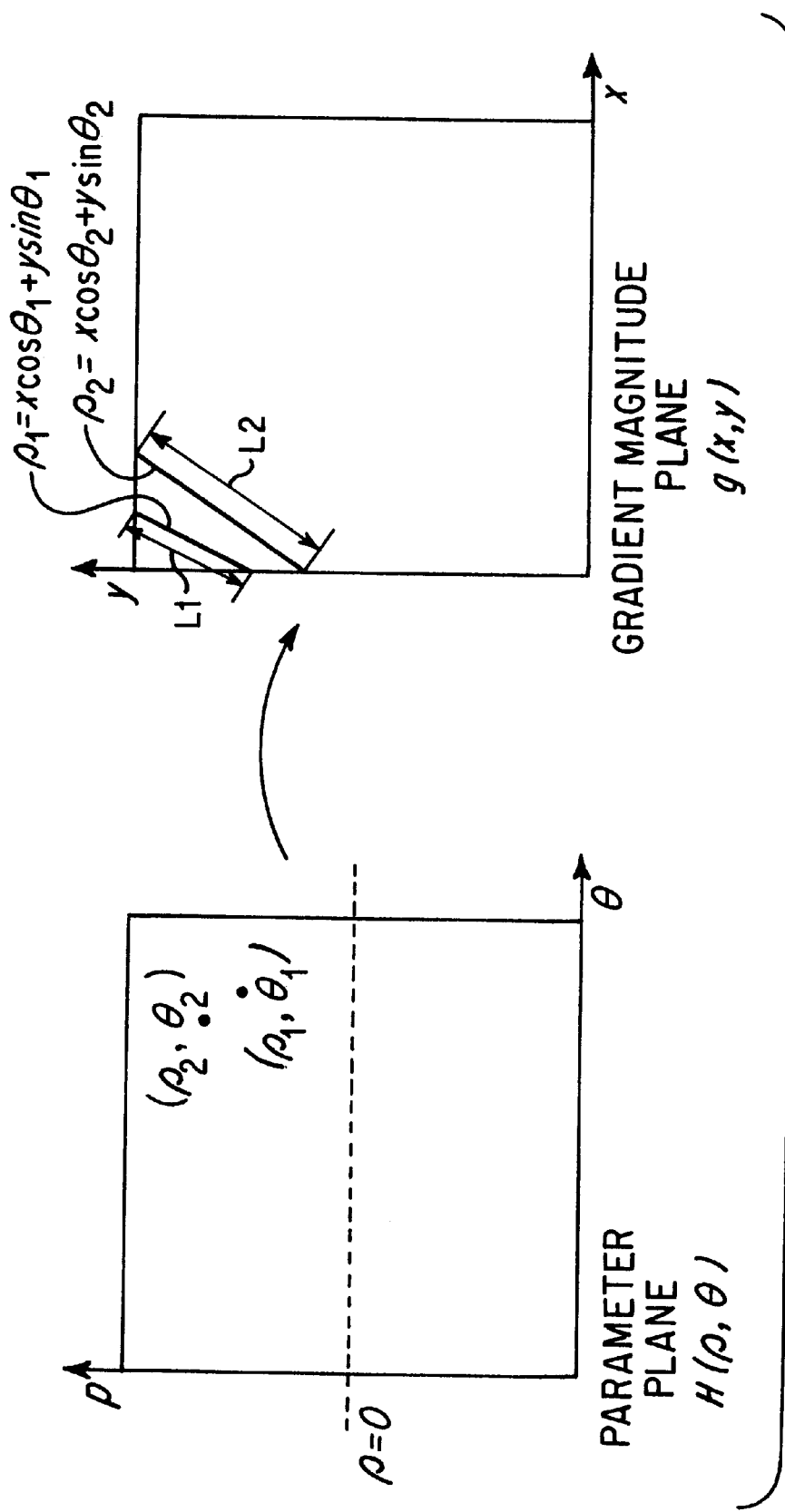
FIG. 8 shows backprojections of two parameter plane points into the gradient magnitude plane.

Once the non-interesting ranges of $H(\rho,\theta)$ are set to zero, a normalization function NF is applied. FIG. 8 shows backprojections of two parameter plane points $(\rho_1,\theta_1)$ and $(\rho_2,\theta_2)$ into the gradient magnitude plane (x,y). As shown in FIG. 8, the number of gradient magnitude plane pixels which may have contributed to the parameter plane at $(\rho_1,\theta_1)$ and $(\rho_2,\theta_2)$ is directly proportional to the length of their corresponding lines L1 and L2 in the gradient magnitude plane. However, the length of the lines L1 or L2 is not related to the location of the pectoral boundary; each is equally possible. Accordingly, it is desirable to normalize the parameter plane $H(\rho,\theta)$ at each point $(\rho,\theta)$ according to equation (3).

$$HN(\rho,\theta) = H(\rho,\theta)^* NF(L(\rho,\theta)) \quad \{\text{Eq. 3}\}$$

Where $NF(L(\rho,\theta))$ is a normalizing factor which is generally inversely proportional to $L(\rho,\theta)$, the length of a backprojected line in the gradient magnitude plane having offset $\rho$ and angle $\theta$. In a preferred embodiment, the value of $NF(L(\rho,\theta))$ is shown at equation (4).

$$NF(L(\rho, \theta)) = \begin{cases} 1/sqrt(L(\rho, \theta)) & L(\rho, \theta) > N/10 \\ 10/N & L(\rho, \theta) < N/10 \end{cases} \quad \{\text{Eq. 4}\}$$

In equation (4), N is the number of pixels on a side of the locally averaged digital mammogram 100. A lower limit of N/10 is used to avoid granting too much weight to an extremely short "line" in the corner of the gradient magnitude plane. Overall, equation (4) has been found to balance the effect of a bias toward longer pectoral boundaries when no correction (NF=1) is performed, and of being too sensitive to noise for a full correction (NF=1/L($\rho,\theta$)). In general, the specific function used for NF(L($\rho,\theta$)) may be empirically optimized based on system performance.

At step 414, local maxima of the normalized parameter plane HN($\rho,\theta$) are analyzed for determining a highest ranking peak, which will correspond to ($\rho_P,\theta_P$) of the pectoral boundary. Generally, a combination of normalized parameter plane peaks and image domain characteristics are used to determine the highest ranking peak. While there are many methods of normalized parameter plane analysis which fall within the scope of the present invention, the preferred embodiment disclosed herein is found to consistently yield accurate pectoral boundary parameters.

Figure 9:
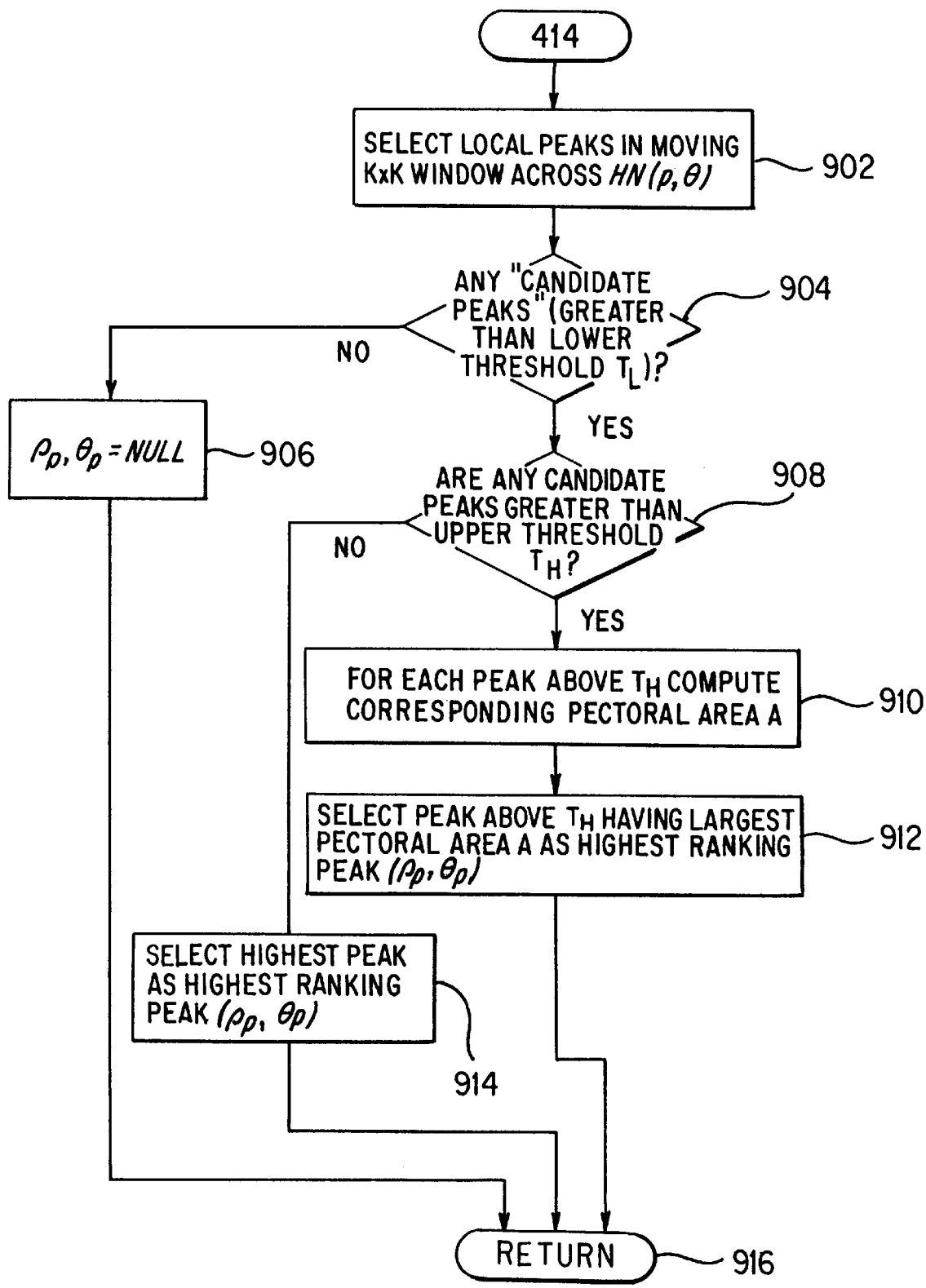
FIG. 9 shows the steps used in determining a highest ranking peak of the normalized parameter plane according to a preferred embodiment.

FIG. 9 shows the steps used in determining a highest ranking peak of the normalized parameter plane HN($\rho,\theta$) according to a preferred embodiment. At step 902, a generally small K×K window is moved across the normalized parameter plane HN($\rho,\theta$) and centered on each pixel. Each pixel which is a maximum within the K×K window is selected as a local peak. The size of the K×K window may be made larger to decrease the number of local peaks detected or made smaller to increase the number of local peaks detected. Where the scaled digital mammogram and normalized parameter planes are of the size described previously, an appropriate value for the parameter K has been found to be 5.

At step 904, it is determined whether there exist any candidate peaks, defined as those local peaks having a value of HN($\rho,\theta$) greater than a predetermined lower threshold $T_L$. If there are no candidate peaks, there is no probably no detectable pectoral boundary, and the highest ranking peak ($\rho_P,\theta_P$) is set to NULL at step 906. If there are candidate peaks, step 908 is performed.

The magnitude of the lower threshold $T_L$ may be empirically determined by a person of skill in the art to detect an appropriate number of candidate peaks. It has been found, however, that where the scaled digital mammogram and normalized parameter planes are of the size described previously, an appropriate number is $T_L$=350. Advantageously, once the appropriate value of $T_L$ is determined, this value does not require repeated adjustment among different digital mammograms, because the weighting factor W(g) in the Hough transform step 410, supra, results in an algorithm which is robust against variations in background gray scale levels.

At step 908, it is determined whether any of the candidate peaks have a value of HN($\rho,\theta$) greater than a predetermined upper threshold $T_H$. If no such candidate peaks are found, step 914 is performed, whereby the highest ranking peak ($\rho_P,\theta_P$) is simply selected as the highest candidate peak. However, if candidate peaks having a value of HN($\rho,\theta$) greater than $T_H$ are found, step 910 is performed.

At step 910, each candidate peak having a value of HN($\rho,\theta$) greater than $T_H$ are backprojected into the image or gradient magnitude plane in a manner similar to that shown in FIG. 8. The corresponding pectoral area A for each such candidate peak is determined as the area of a right triangle formed by the backprojected line L and the upper left corner of the digital mammogram. It has been found that the a desirable choice for ($\rho_P,\theta_P$) is that candidate peak having a value HN($\rho,\theta$) greater than $T_H$ which has the largest corresponding pectoral area A. Accordingly, at step 912, ($\rho_P,\theta_P$) are selected as that candidate peak having a value HN($\rho,\theta$) greater than $T_H$ which has the largest corresponding pectoral area A.

The magnitude of the upper threshold $T_H$ may be empirically determined by a person of skill in the art as the appropriate peak level HN($\rho,\theta$) above which the relative corresponding pectoral areas of the candidate peaks should be considered. It has been found, however, that where the scaled digital mammogram and normalized parameter planes are of the size described previously, an appropriate number is $T_H$=550. Advantageously, as with $T_L$, once the appropriate value of $T_H$ is determined, this value does not require repeated adjustment among different digital mammograms.

As discussed previously, the step 304 for segmenting the pectoral muscle portion from the remainder of the breast tissue portion is complete upon a determination of ($\rho_P,\theta_P$). These parameters are then advantageously used by subsequent image processing algorithms in detecting suspicious portions of the digital mammogram 100. It has been found that the method according to the preferred embodiment is highly reliable in identifying the line ($\rho_P,\theta_P$) which most closely approximates the pectoral boundary, with tests showing an error rate as low as one percent.

While the straight-line parameters of the pectoral boundary are found to suffice for most purposes, the above method may be adapted for determining more precise nonlinear contours of the pectoral boundary. For example, the above method may be used in conjunction with dynamic programming or adaptive contour methods, for finding the most optimal selection of the pectoral boundary near the detected straight line.

While preferred embodiments of the invention have been described, these descriptions are merely illustrative and are not intended to limit the present invention. For example, although the embodiments of the invention described above were in the context of a system for computer aided diagnosis of digital mammograms, those skilled in the art will recognize that the disclosed methods and structures are readily adaptable for broader applications. For example, the invention is applicable to many other types of CAD systems for detection of other types of medical abnormalities.

What is claimed is:

1. A method of identifying a pectoral boundary in a digital mammogram, said pectoral boundary being characterized by at least one parameter, comprising the steps of:

determining a region of interest containing said pectoral boundary;

calculating gradient magnitudes inside said region of interest;

accumulating said gradient magnitudes into a parameter plane, represented by H($\rho,\theta$), according to a Hough transform; and using information in said parameter plane for identifying said at least one parameter of said pectoral boundary;

wherein said step of using information in said parameter plane comprises the steps of:

selecting a parameter plane region of interest corresponding to the range of possible angles normal to said pectoral boundary;

creating a normalized parameter plane HN($\rho,\theta$) by normalizing the value H($\rho,\theta$) by a normalizing factor, said normalizing factor being inversely related to the number of gradient magnitude pixels capable of being accumulated at ($\rho,\theta$);

identifying a highest ranking local peak of said normalized parameter plane HN($\rho,\theta$); and using the location of said highest ranking local peak for determining said at least one parameter of said pectoral boundary; and wherein said normalizing factor is determined for each pixel ($\rho,\theta$) by the steps of:
   backprojecting a line corresponding to ($\rho,\theta$) into the image plane;
   determining the length L of said line; and
   setting said normalizing factor equal to 1/sqrt(L) if L is greater than a first number of pixels.

2. The method of claim 1, wherein said step of accumulating said gradient magnitudes comprises the step of weighting said gradient magnitudes according to a monotonic, multi-bit weighting function designed to exhibit larger variations near more densely populated levels of gradient magnitudes, and designed to exhibit smaller variations near less densely populated levels of gradient magnitudes.

3. The method of claim 2, wherein said weighting function for a selected gradient magnitude is proportional to the integral of a histogram of said gradient magnitudes taken between a first gradient magnitude and said selected gradient magnitude.

4. The method of claim 3, said digital mammogram being represented by M(x,y), said gradient magnitudes being represented by g(x,y), said gradient angles being represented by fi(x,y), said parameter plane being represented by H($\rho,\theta$), and said weighting function being represented by W(g), said step of accumulating said gradient magnitudes into a parameter plane using a Hough transform comprising the steps of:
   for each gradient magnitude at pixel (x,y) being accumulated, determining a set of parameter plane destination pixels ($\rho,\theta$) to be accumulated; and
   incrementing H($\rho,\theta$) at each of said parameter plane destination pixels by an amount equal to W(g(x,y)).

5. The method of claim 4, wherein for each gradient plane pixel at (x,y), said set of parameter plane destination pixels is selected according to the constraint $\rho = x \cos(\theta) + y \sin(\theta)$, and wherein only those parameter plane destinations having $\theta$ within a fixed interval $\Delta\theta_{INTERVAL}$ of fi(x,y) are incremented.

6. The method of claim 1, said step of identifying a highest ranking local peak further comprising the steps of:
   determining whether a first set of peaks of HN($\rho, \theta$) above a lower predetermined threshold $T_L$ can be found;
   if such a first set of peaks cannot be found, selecting a NULL value as the highest ranking local peak;
   if such a first set can be found, determining if a second set of peak of HN($\rho,\theta$) above an upper predetermined threshold $T_H$ can be found;
   if such a second set of peaks can be found, determining the corresponding area A of a segmented pectoral muscle in image space corresponding to each of said second set of peaks, and selecting that peak having the greatest corresponding area A as the highest ranking local peak;
   if such a second set of peaks above $T_H$ cannot be found, selecting the largest of said first set of peaks as the highest ranking local peak.

7. The method of claim 1, said gradient magnitude plane being N pixels on a side, said first number of pixels being approximately N/10, wherein said normalizing factor set to 1/sqrt(N/10) if L is less than approximately N/10 pixels.

8. The method of claim 1, further comprising the step of computing gradient angles inside said region of interest, wherein said step of accumulating gradient magnitudes comprises the step of only accumulating gradient magnitudes associated with a predetermined range of gradient angles.

9. The method of claim 8, said pectoral boundary defining a pectoral muscle portion of the digital mammogram, said pectoral muscle portion encompassing a first corner of said digital mammogram, wherein said predetermined range of gradient angles includes an angle corresponding to said first corner and a first range of angles therearound.

10. The method of claim 9, wherein said first range of angles is approximately 90 degrees.

11. The method of claim 10, said digital mammogram comprising a tissue portion including a pectoral muscle portion and a breast tissue portion, said pectoral boundary defining said pectoral muscle portion, said pectoral muscle portion encompassing a first corner of said digital mammogram, said step of determining a region of interest including the steps of:
   determining a center of mass of said tissue area; and
   selecting said region of interest above a line centered at said center of mass and having a predetermined slope.

12. The method of claim 11, wherein said predetermined slope is approximately 1.5.

13. A method of identifying a boundary between a first portion and a second portion of a digitized radiograph, said second portion corresponding to a tissue area of generally higher density than said first portion, said boundary generally being a linear boundary, comprising the steps of:
   determining a region of interest containing said boundary;
   calculating gradient magnitudes inside said region of interest;
   accumulating said gradient magnitudes into a parameter plane, represented by H($\rho,\theta$), according to a transform function;
   using information in said parameter plane for identifying said linear boundary;
   wherein said step of using information in said parameter plane comprises the steps of:
      selecting a parameter plane region of interest corresponding to the range of possible angles normal to said pectoral boundary;
      creating a normalized parameter plane HN($\rho,\theta$) by normalizing the value H($\rho,\theta$) by a normalizing factor, said normalizing factor being inversely related to the number of gradient magnitude pixels capable of being accumulated at ($\rho,\theta$);
      identifying a highest ranking local peak of said normalized parameter plane HN($\rho,\theta$); and
      using the location of said highest ranking local peak for determining said at least one parameter of said linear boundary; and
   wherein said normalizing factor is determined for each pixel ($\rho,\theta$) by the steps of:
      backprojecting a line corresponding to ($\rho,\theta$) into the image plane;
      determining the length L of said line;
      setting said normalizing factor equal to 1/sqrt(L) if L is greater than a first number of pixels.

14. The method of claim 13, wherein said step of accumulating said gradient magnitudes comprises the step of weighting said gradient magnitudes according to a monotonic, multi-bit weighting function designed to exhibit larger variations near more densely populated levels of gradient magnitudes, and designed to exhibit smaller variations near less densely populated levels of gradient magnitudes.

15. The method of claim 13, wherein said transform function is a Hough transform, and wherein for each gradient plane pixel at (x,y), said set of parameter plane destination pixels is selected according to the constraint $\rho = x \cos(\theta) + y \sin(\theta)$, and wherein only those parameter plane destinations having $\theta$ within a fixed interval $\Delta\theta_{INTERVAL}$ of fi(x,y) are incremented.

16. The method of claim 15, said highest ranking local peak being at a location $(\rho 1, \theta 1)$, said linear boundary being characterized by an angle parameter and an offset parameter, wherein said angle parameter is set equal to $\theta 1$ and said offset parameter is set equal to $\rho 1$.

17. A method of identifying a pectoral boundary in a digital mammogram D(x,y), said pectoral boundary being a linear boundary characterized by an offset parameter and an angle parameter, comprising the steps of:

determining a region of interest containing said pectoral boundary;

calculating gradient magnitudes g(x,y) inside said region of interest;

weighting said gradient magnitudes g(x,y) by a monotonic, multi-bit weighting function designed to exhibit larger variations near more densely populated levels of gradient magnitudes, and designed to exhibit smaller variations near less densely populated levels of gradient magnitudes, for producing weighted gradient magnitudes;

accumulating said weighted gradient magnitudes into a parameter plane $H(\rho,\theta)$ according to a Hough transform $\rho = x \cos(\theta) + y \sin(\theta)$;

creating a normalized parameter plane $HN(\rho,\theta)$ by normalizing the value $H(\rho,\theta)$ by a normalizing factor, said normalizing factor being inversely related to the number of gradient magnitude pixels capable of being accumulated at $(\rho,\theta)$;

identifying a highest ranking local peak of said normalized parameter plane $HN(\rho,\theta)$, said highest ranking local peak being at a location $(\rho_P, \theta_P)$, wherein said angle parameter is set equal to $\theta_P$ and said offset parameter is set equal to $\rho_P$;

wherein said digital mammogram comprises a tissue portion including a pectoral muscle portion and a breast tissue portion, said pectoral boundary defining said pectoral muscle portion, said pectoral muscle portion encompassing a first corner of said digital mammogram, said step of determining a region of interest including the steps of:

determining a center of mass of said tissue area; and selecting said region of interest above a line centered at said center of mass and having a predetermined slope.

18. A method of identifying a pectoral boundary in a digital mammogram, said pectoral boundary being characterized by at least one parameter, comprising the steps of:

determining a region of interest containing said pectoral boundary;

calculating gradient magnitudes inside said region of interest;

computing gradient angles inside said region of interest;

accumulating only gradient magnitudes associated with a predetermined range of angles into a parameter plane according to a Hough transform; and using information in said parameter plane for identifying said at least one parameter of said pectoral boundary;

wherein said digital mammogram comprises a tissue portion including a pectoral muscle portion and a breast tissue portion, said pectoral boundary defines a pectoral muscle portion of the digital mammogram, said pectoral muscle portion encompasses a first corner of said digital mammogram, wherein said predetermined range of gradient angles includes an angle corresponding to said first corner and a first range of angles that is approximately 90 degrees and said step of determining a region of interest includes the steps of:

determining a center of mass of said tissue area; and selecting said region of interest above a line centered at said center of mass and having a predetermined slope.

19. A method of identifying a pectoral boundary in a digital mammogram, said pectoral boundary being characterized by at least one parameter, comprising the steps of:

determining a region of interest containing said pectoral boundary;

calculating gradient magnitudes inside said region of interest;

accumulating said gradient magnitudes into a parameter plane, represented by $H(\rho,\theta)$, according to a Hough transform; and using information in said parameter plane for identifying said at least one parameter of said pectoral boundary;

wherein said step of using information in said parameter plane comprises the steps of:

selecting a parameter plane region of interest corresponding to the range of possible angles normal to said pectoral boundary;

said parameter plane being represented by $H(\rho,\theta)$, wherein said step of using information in said parameter plane comprises the steps of:

selecting a parameter plane region of interest corresponding to the range of possible angles normal to said pectoral boundary;

creating a normalized parameter plane $HN(\rho, \theta)$ by normalizing the value $H(\rho,\theta)$ by a normalizing factor, said normalizing factor being inversely related to the number of gradient magnitude pixels capable of being accumulated at $(\rho,\theta)$;

identifying a highest ranking local peak of said normalized parameter plane $HN(\rho,\theta)$;

using the location of said highest ranking local peak for determining said at least one parameter of said pectoral boundary; and said step of identifying a highest ranking local peak further comprises the steps of:

determining whether a first set of peaks of $HN(\rho, \theta)$ above a lower predetermined threshold $T_L$ can be found;

if such a first set of peaks cannot be found, selecting a NULL value as the highest ranking local peak;

if such a first set can be found, determining if a second set of peaks of $HN(\rho,\theta)$ above an upper predetermined threshold $T_H$ can be found;

if such a second set of peaks can be found, determining the corresponding area A of a segmented pectoral muscle in image space corresponding to each of said second set of peaks, and selecting that peak having the greatest corresponding area A as the highest ranking local peak;

if such a second set of peaks above $T_H$ cannot be found, selecting the largest of said first set of peaks as the highest ranking local peak.

* * * * *